Figure 1:
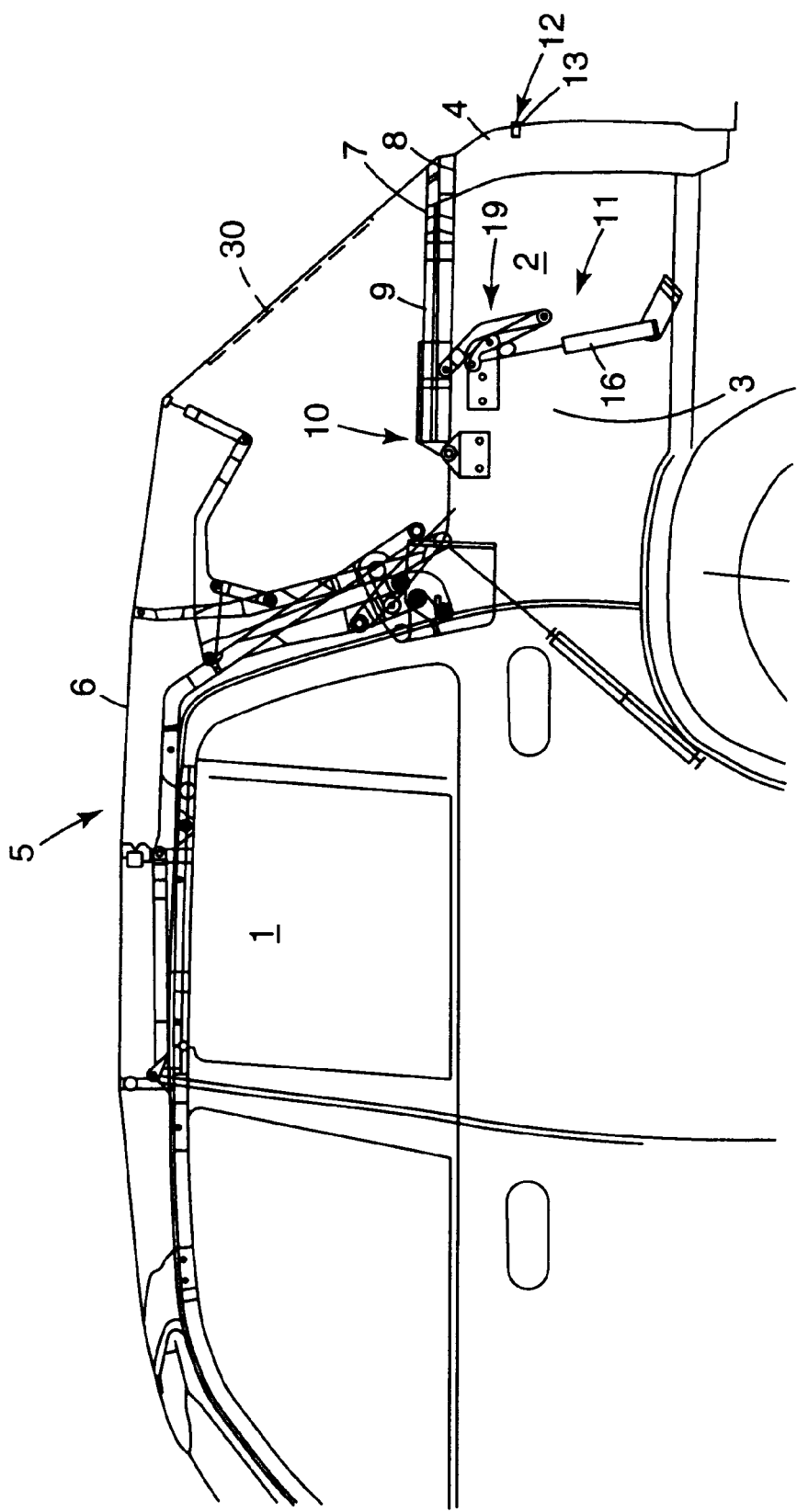

United States Patent
Kinnanen et al.

[11] Patent Number: 6,095,589
[45] Date of Patent: Aug. 1, 2000

[54] VEHICLE AND FOLDING TOP FOR A VEHICLE

[75] Inventors: Matti Kinnanen, Laitila; Olli Hyytiä, Uusikaupunki; Veijo Mattila, Kalanti; Esa Kiiski, Uusikaupunki, all of Finland

[73] Assignee: Valmet Auotmotive Oy, Uusikaupunki, Finland

[21] Appl. No.: 09/190,358

[22] Filed: Nov. 12, 1998

[30] Foreign Application Priority Data

Feb. 27, 1998 [FI] Finland ..................................... 980455

[51] Int. Cl.$^7$ ........................................................ B60J 7/00
[52] U.S. Cl. ....................... 296/107.09; 296/111; 296/112
[58] Field of Search ..................... 296/111, 112, 296/118, 107.09, 57.1

[56] References Cited

U.S. PATENT DOCUMENTS

| | | | |
|---|---|---|---|
| 340,809 | 4/1886 | Metcalfe | 296/112 |
| 986,533 | 3/1911 | Woddell | 296/118 |
| 2,076,243 | 4/1937 | Marshall et al. | 296/107.09 |
| 2,368,133 | 6/1945 | Galamg | 296/112 |
| 2,833,593 | 5/1958 | Olivier et al. | 296/107.09 |
| 4,402,544 | 9/1983 | Artim et al. | 296/111 |
| 5,042,868 | 8/1991 | Northaft et al. | 296/107.09 |
| 5,219,200 | 6/1993 | Orth et al. | 296/107.09 |
| 5,225,747 | 7/1993 | Helms et al. | 296/107.09 |
| 5,251,952 | 10/1993 | Guckel et al. | 296/107.09 |
| 5,445,429 | 8/1995 | Koehler et al. | 296/107.09 |
| 5,467,596 | 11/1995 | Yu | 296/107.09 |
| 5,582,454 | 12/1996 | Grover | 296/107.09 |
| 5,620,226 | 4/1997 | Saautter, Jr. | 296/107.09 |
| 5,667,269 | 9/1997 | Prenger et al. | 296/107.09 |
| 5,682,807 | 11/1997 | Mentink | 296/107.09 |
| 5,749,619 | 5/1998 | Mentink | 296/107.09 |
| 5,758,923 | 6/1998 | Kolb | 296/107.09 |
| 5,772,274 | 6/1998 | Tokarz | 296/107.09 |
| 5,903,119 | 5/1999 | Laurain et al. | 296/107.09 |
| 5,971,470 | 10/1999 | May et al. | 296/107.09 |

*Primary Examiner*—Joseph D. Pape
*Assistant Examiner*—Kiran Patel
*Attorney, Agent, or Firm*—Altera Law Group LLC

[57] ABSTRACT

The invention relates to a vehicle and a folding top. The folding top (5) comprises a top cover (6) of flexible material fitted to extend at least over the luggage compartment (2) when the top is in its closed position, limiting the luggage compartment in the vertical direction, a U-shaped rear bow (7), to which the rear edge of the top cover is attached and which comprises a substantially horizontal transverse arm (8) and two substantially forward directed arms (9) at the ends of the transverse arm, the front ends (10) of said two arms (9) being connected to joints allowing a turning motion relative to the body, and which rear bow can be turned between a lowered closed position, in which the rear bow leans against the body and tailgate in close contact with them, and a raised open position. The top comprises a power means (11) for raising and lowering the rear bow (7), and an operating switch (12) disposed in the immediate vicinity of the tailgate (4) for activating the power means.

14 Claims, 4 Drawing Sheets

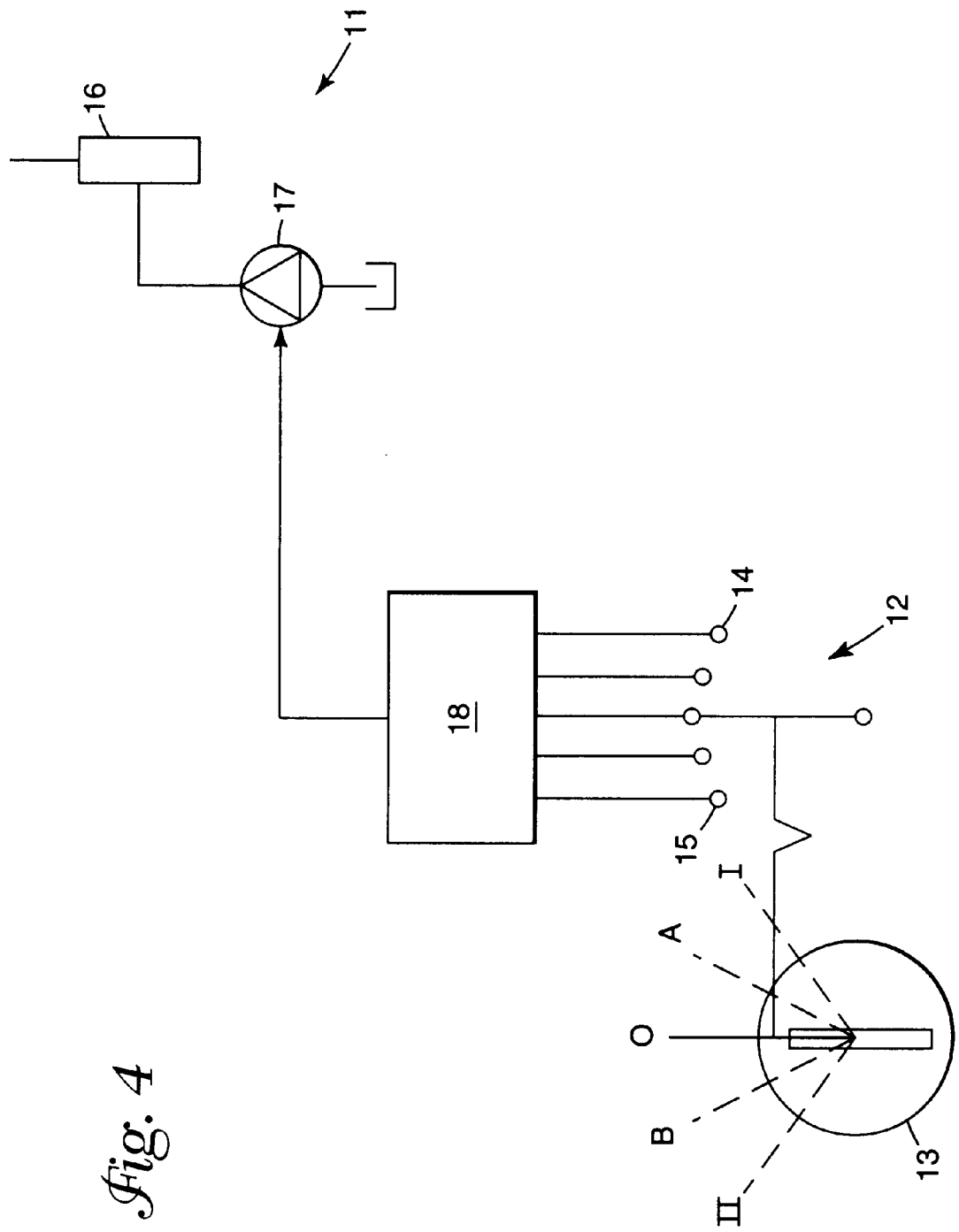

VEHICLE AND FOLDING TOP FOR A VEHICLE

The present invention relates to a vehicle as defined in the preamble of claim 1. Moreover, the invention relates to a folding top as defined in the preamble of claim 8.

In general, the invention relates to a multipurpose vehicle, which today often means an all-terrain vehicle or a so-called urban jeep which can be equipped with a folding top. Examples of such vehicles are e.g. the convertible versions of Land-Rover Freelander and the G-Wagen of Mercedes-Benz. Both automobiles are 3-door types, i.e. vehicles with two doors and a tailgate.

As a multipurpose urban jeep typically has 4 or 5 seats, or 2 seat rows, it will be easier to use if it has 4 or 5 doors. A convertible of this type can be equipped with a foldable top of conventional structure as is used in 'ordinary' 4-seat convertibles.

When a vehicle is used in off-road conditions, the irregular wheel loads and tilting impose a heavier strain on the body structures than in normal use of a car. Because of a greater risk of rolling over, off-road use also calls for a better roll-over security than is required in the case of a conventional convertible. Therefore, it is preferable to retain a body structure with full-height columns and frames around the doors and in the upper part of the vehicle and connect the left and right "frame parts" of the body in the upper rear part of the vehicle to each other with a transverse beam. Such structures are known, e.g. from vehicles like those mentioned at the beginning, which are already available on the market. In this way, the structure of a multipurpose vehicle or all-terrain vehicle with 4–5 doors can be reinforced especially as regards the B-pillar, i.e. the column supporting the rearward side doors, and side crash safety.

The Land-Rover Freelander convertible jeep has a tailgate hinged by one of its vertical edges. The tailgate comprises a hard rear window and a window mechanism, and the rear window can be lowered inside the tailgate. The tailgate is provided with a rear window wiper-washer. The rear end of the body is open when the tailgate is open, having no transverse beam. The top structure comprises a U-shaped rearward bow with joints connecting it to the rear edges of the upper part of the body, said rearward bow passing transversely from the upper rear part of the top to above the rear window. The rear side windows are made of plastic and they are attached to the body structure by slide tracks, and they can be detached altogether from the rest of the soft top (top cover), to which they are attached by zip fasteners and sticker joints. The top can only be opened and closed manually by releasing the above-mentioned side window parts from their slide tracks and turning said U-shaped bow to an oblique forward position so that it leans against the forward slanting rear surface of the upper part of the body structure. When the soft top is to be opened, the above-mentioned top cover can (and must) be rolled up manually and fastened with quick-release fasteners to a transverse bow in the upper part of the body. The vehicle can be made completely open by releasing the pieces of a two-part hard top protecting the front passengers from their locks and lifting them manually into the boot of the vehicle, where they occupy some space. The tailgate can only be opened/closed when the rear window has been driven into its low position inside the tailgate.

In Mercedes-Benz G-Wagen, the top is a typical soft top as used in traditional convertibles, with a mechanism that allows it to be raised/lowered manually or, as an option, hydraulically, and locked at the front to the windshield frame by means of a manual lever. G-Wagen has no separate hard top pieces but a soft top that covers the entire body structure of the vehicle. The rear window is made of plastic and integrated with the top. The, soft top fabric has been fastened to the rear part of the open body structure (~waistline) mechanically using screws. The flap at the rear edge of the soft top fabric is fastened to the upper edge of the tailgate by means of press studs, which have to be released first to allow the tailgate to be opened. The tailgate is an opening in the body structure and it is hinged by its lower edge. When open, the tailgate remains in a horizontal position and prevents objects of a size larger than the tailgate from being loaded onto the vehicle from behind. With the soft top in the closed position, the upper part of the luggage compartment is likely to remain unutilised unless it is loaded from the inside, which significantly reduces its usability.

Further, in a seminar called "Cabrio-Systeme" (Haus der Technik, Klein, firma CTS) held in Essen, Germany during Apr. 24–25, 1996, a picture and other information was presented about a vehicle resembling those described above, comprising a passenger compartment and a luggage space, the latter being located in the rear part of the vehicle behind the passenger compartment. The sides of the vehicle body limit the luggage space in the lateral directions. A tailgate, which can be opened and closed, is hinged on the body and limits the luggage space in the rearward direction. The vehicle further comprises a folding top, which comprises a top cover made of flexible material. In its closed position, the top extends over the luggage compartment, limiting it from above. As regards the aspects referred to above, the vehicle presented in the seminar corresponds to the convertible jeeps described above. The picture presented in the seminar also showed that the top of such a vehicle may comprise a U-shaped rear bow which can be raised and lowered and to which the rear edge of the top cover is attached. The rear bow can be turned between a lowered closed position, in which the rear bow leans against the body and the tailgate, and a raised open position.-In the open position, the opening into the luggage compartment can be enlarged to allow easier loading. However, the operating mechanism for raising and lowering the rear bow was not described in any way in the presentation.

The object of the present invention is to eliminate the drawbacks mentioned above and to produce an improvement to a previously known vehicle and folding top.

A specific object of the present invention is to disclose a folding top for a vehicle that significantly facilitates the loading of the luggage compartment of the vehicle via the tailgate.

The vehicle of the invention is characterised by what is presented in claim 1. The folding top of the invention is characterised by what is presented in claim 8.

According to the invention, the top comprises a power means for raising and lowering the rear bow, and, placed in the immediate vicinity of the tailgate, an operating switch for activating the power means.

In an embodiment of the vehicle and folding top, the operating switch is mounted on the body near the tailgate. Alternatively, the operating switch may be mounted on the tailgate. The operating switch may be any known type of electric switch, such as a pushbutton switch or a rotary switch.

In an embodiment of the vehicle and folding top, the tailgate is provided with a key-operated lock for locking the tailgate with respect to the body. In this case, the operating switch is connected to the lock, to be operated with the same key as the lock.

In an embodiment of the vehicle and folding top, the operating switch is a so-called multi-position switch. The operating switch comprises a first switch, which is so implemented that, in its connected position, it causes the power means to raise the rear bow, and a second switch, which is so implemented that, in its connected position, it causes the power means to lower the rear bow.

In an embodiment of the vehicle and folding top, the first switch is so implemented that it will connect when the key is turned to a first position in the lock, and the second switch is so implemented that it will connect when the key is turned to a second position in the lock.

In an embodiment of the vehicle and folding top, the power means comprises a double-acting hydraulic cylinder, and a hydraulic pump for generating a hydraulic pressure for the hydraulic cylinder. The first switch and the second switch are microswitches placed in the lock. The top comprises a control logic system designed to receive signals from the microswitches and control the operation of the hydraulic pump on the basis of the signals received from the microswitches.

Figure 2:
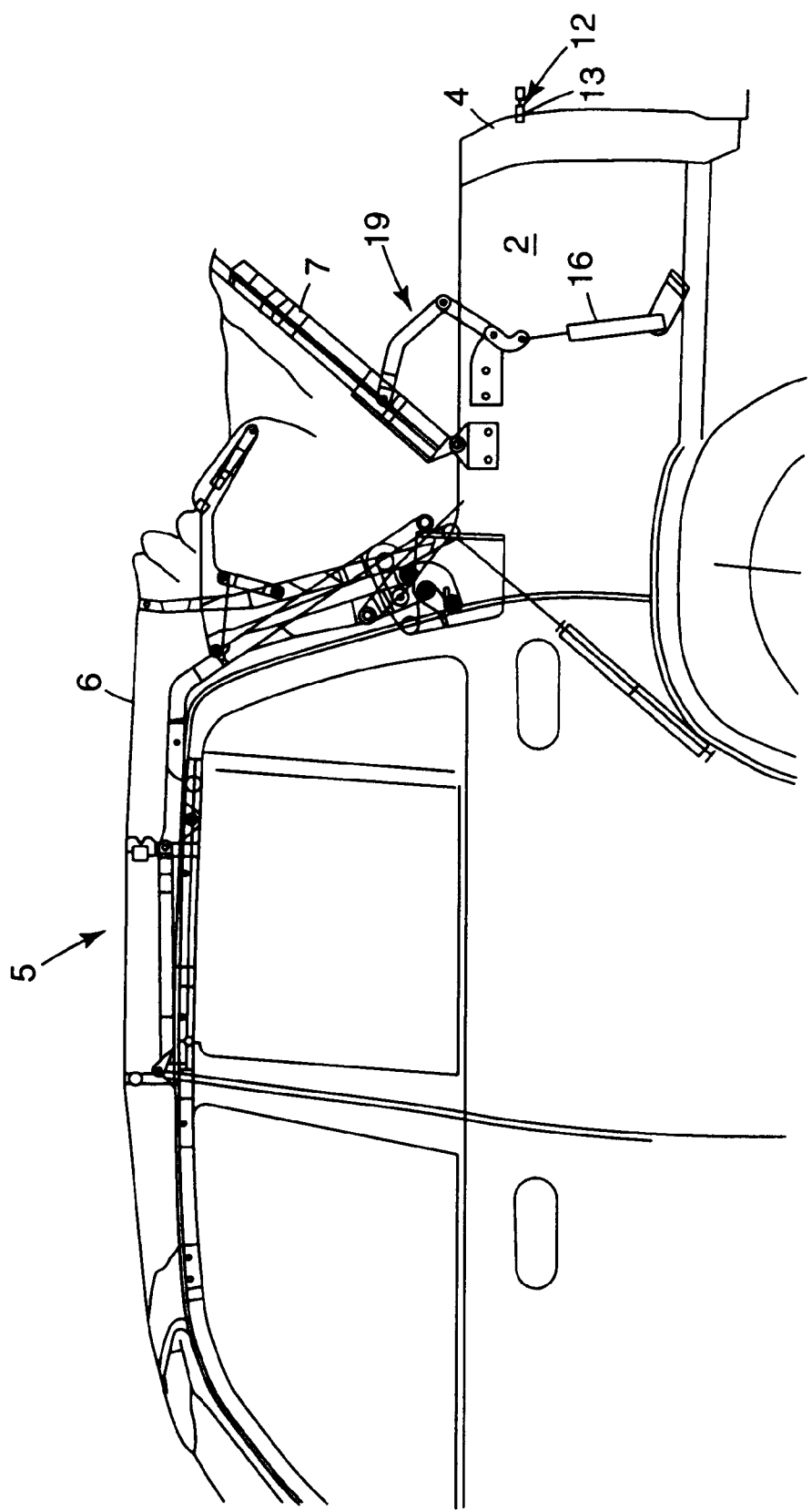

In the following, the invention will be described in detail by the aid of a few examples of its embodiments by referring to the attached drawings, wherein FIG. 1 presents a diagrammatic side view of an embodiment of the vehicle of the invention with a folding top in a fully closed position, FIG. 2 presents the vehicle in FIG. 1 with the rear bow in the raised open position while the rest of the top structure is in the closed position over the passenger compartment.

Figure 3:
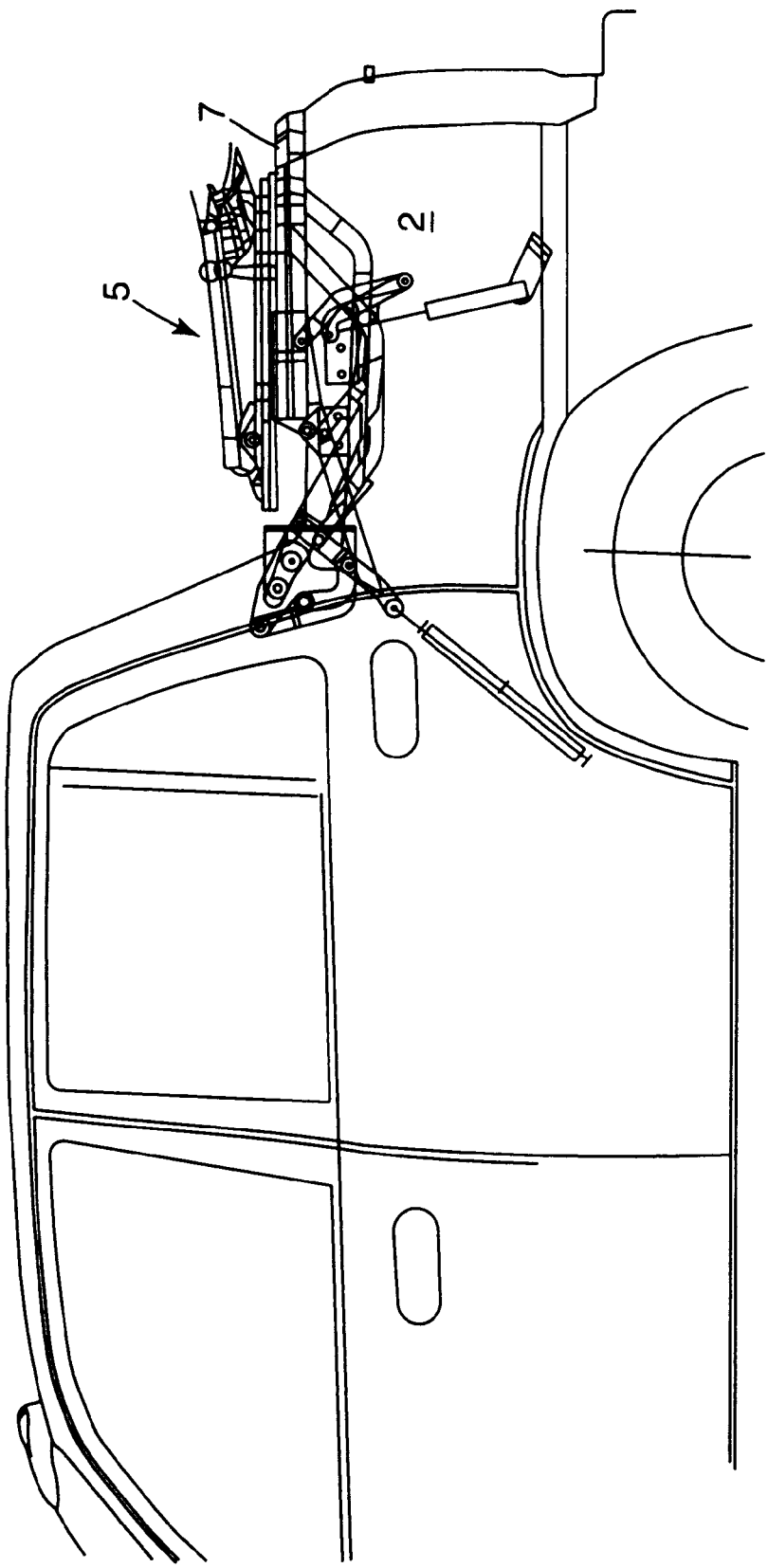

FIG. 3 presents the vehicle in FIG. 1 with the folding top folded down to its open position over the luggage compartment, and FIG. 4 presents a diagram illustrating the control of the rear bow power means using a multi-position operating switch mounted in conjunction with the tailgate lock.

FIGS. 1–3 present a convertible automobile which is a 5-door type, i.e. a 4-door vehicle provided with a tailgate 4 and having no transverse beam at the "waistline" in its rear part. The vehicle has (4 or) 5 seats arranged in two rows. In such a vehicle, the seats could also be arranged in three rows, or the vehicle could be provided with additional seats placed in the load area in its rear part, in which case the number of seats could be seven, and perhaps even eight if the total width of the vehicle is increased.

The top 5 of the vehicle is completely foldable, provided with a top cover fabric 6, and integrated into a single assembly. As in the Land-Rover, this vehicle top, too, could have a front part composed of separate (semi)hard, manually detachable pieces, but in that case opening the top and getting out of the vehicle would be more laborious. However, the vehicle in FIGS. 1–3 has a top mechanism typical of the traditional convertible, in other words, the main knuckle points of the top mechanism are located symmetrically on the right and left side structures of the vehicle. Such top mechanisms of convertible vehicles are part of the skilled person's expertise, so they will not be described here in detail. The top 5 can be so implemented that it can be raised (controlled) and lowered (opened) both manually and using a power means.

The top structure 5 comprises a U-shaped rear bow 7, to which the flexible top material of the top cover 6 is attached by its rear edge. The rear bow 7 is supported by joints on the rear sides 3 of the body structure, separately from the actual top mechanism. At the ends of the substantially horizontal transverse arm 8 of the U-shaped rear bow 7 there are two forward directed arms 9, whose front ends 10 are connected to joints allowing them to be turned relative to the vehicle body. The rear bow 7 can be raised and lowered between the positions shown in FIGS. 1 and 2, either manually or, considering requirements regarding ease of use, using an electric/electrohydraulic power means 11. In this example, the power means 11 comprises a hydraulic cylinder 16, whose cylinder part is connected to the body while the piston rod, which is movable relative to the cylinder, is connected via a torque link mechanism 19 to the rear bow 7.

Attached to the top fabric 5 is a rear window 30, made either of hard or soft material. With current techniques, the heating of a hard window in cold and wet conditions can be more easily implemented. The rear window 30 may also be provided with a wiper-washer system (not shown in the figure), which can preferably be attached in a known manner to holes made in the rear window during manufacture and which is raised and lowered together with the rear bow as a part of the rear window assembly. The electricity to the system can be supplied in the same ways as to the window heating system, i.e. via insulated conductors running along the rear bow 7. As the rear bow 7 together with its raising mechanism forms a separate assembly in relation to the rest of the top frame and mechanism, its raising can be controlled separately from the rest of the top structure if necessary, provided that the top is in the closed position as shown in FIG. 1.

The air, water and soundproofing sealing at the junctures between the top 5, rear bow 7 and the body structure can be implemented by using seals attached either to the edge of the top mechanism or to the edge of the body structure or using a combination of these. Sealing structures in themselves are previously known in convertibles. Since the rear bow 7 is not mechanically connected to the upper edge of the tailgate 4, the juncture and sealing between them can be advantageously implemented in a manner that allows the tailgate 4 to be opened and closed while the rear bow 7 is in its lowered position. Since the rear bow 7 remains in the same position regardless of whether the top 5 is open or closed, use of the tailgate is "independent" of the position of the top. In a convertible as illustrated by this example, the use of the rear bow 7 in combination with the above-mentioned solution provides the possibility to raise the rear bow 7 while the vehicle top is in its closed position. Thus, by opening the tailgate 4, the height of the loading opening of the luggage compartment 2 is considerably increased as compared with the height of the open tailgate 4 alone, being doubled at best, and the usability of the luggage compartment is substantially improved.

FIG. 4 presents a simplified diagram of a system for controlling the power means 11 that produces the raising and lowering motions of the rear bow 7. The locking, raising and lowering functions of the tailgate 4 and the rear bow 7 are combined. The tailgate 4 is provided with a lock 13, which can be opened and closed in a known manner from behind using a key or from the driver's seat by means of an electric system or a cable mechanism. The lock 13 and its rotational key positions comprise two new positions I and II, as shown in FIG. 4. Position 0 is a neutral position of the lock 13 and key. By turning the key to position A, the lock 13 of the tailgate 4 is opened. The key is turned back to position 0 to remove the key, and the lock 13 remains unlocked. By turning the key to position B, the lock 13 is locked, and when the key is turned back to position 0, the key can be removed while the lock 13 and the tailgate 4 remain locked. When the key is turned further from position A to position I, a first microswitch 14 in the lock 13 connects a signal current to the control logic 18 of the actuating system of the top structure and its rear bow 7. The control logic 18 activates the electrohydraulic pump 17 to generate a hydraulic pressure for the hydraulic cylinder 16 to raise the rear bow 7 toward its high position for as long as the key is held in position I. Raising the rear bow 7 to its high position takes a few seconds. When the key is turned further from position B to position II, a second microswitch 15 is connected, in which case the signal current controls the lowering of the rear bow 7 and causes the rear bow mechanism to be locked in its horizontal low position above the horizontal edge of the opening in the vehicle body.

When the user wants to load objects into the luggage compartment 2 of a fully locked and closed vehicle without opening the driver's door, the tailgate 4 can be opened from behind using the key and, by turning the key in the lock 13, the rear bow 7 of the vehicle top can be raised at the same time to allow easier loading. Thus, a feature has been created that considerably increases the convenience of use of the vehicle. Because it is not at all necessary to raise or lower the rear bow 7 when the top part covering the passenger compartment of the vehicle is being opened or closed, the functions for raising and lowering the rear bow 7 have not, for reasons of safety, been included in the conventional switch operated from the driver's seat for raising and lowering the top in the case of a folding top according to the proposal which comprises power operated (electric or electrohydraulic) functions for raising and lowering the top.

Thus, the above-described convertible and its top actuating system provided with a power means enable the vehicle top to be raised and lowered from the driver's seat without the driver getting out of the vehicle as well as the luggage compartment to be utilised for the transportation of even large objects, allowing them to be loaded from behind while the functions of the tailgate and the rear bow of the top are controlled by means of the tailgate lock and its key. When objects of a smaller size are to be loaded into the vehicle from behind, it is possible to raise only the rear bow 7 without opening the tailgate 4 e.g. when the rear compartment already contains goods or luggage upon which additional objects are to be loaded. When the top is being folded down, raising the rear bow 7 is electrically prevented by a logic system and detectors, and doing so would not provide any practical advantage regarding the use of the luggage compartment because the top structure when lowered is folded down to a position above/below the waistline.

The invention is not restricted to the examples of its embodiments described above, but many variations are possible within the scope of the inventive idea defined by the claims.

What is claimed is:

1. A vehicle, comprising:

a passenger compartment, a luggage compartment in the rear part of the vehicle behind the passenger compartment, sides of the vehicle body, which limit the luggage compartment in the lateral directions, a tailgate limiting the luggage compartment in the rearward direction, a folding top comprising a top cover made of flexible material and extending in its closed position at least over the luggage compartment, and limiting the luggage compartment in the vertical direction, and a U-shaped rear bow attached to a rear edge of the top cover, the rear bow comprising a substantially horizontal transverse arm and two substantially forward directed arms at the ends of the transverse arm, front ends of said two forward directed arms being connected to joints allowing a turning motion relative to the vehicle body, the rear bow being positionable in a lowered closed position, in which the rear bow leans against the body and tailgate in close contact therewith, and a raised open position, wherein the top comprises a power means for raising and lowering the rear bow, and an operating switch, positioned proximate the tailgate, for activating the power means.

2. A vehicle as defined in claim 1, characterised in that the operating switch is mounted on the body near the tailgate.

3. A vehicle as defined in claim 1, characterised in that the operating switch is mounted on the tailgate.

4. A vehicle as defined in any claim 1, characterised in that the tailgate is provided with a key-operated lock for locking the tailgate with respect to the body and that the operating switch is connected to the lock, to be operated with the same key as the lock.

5. A vehicle as defined in claim 4, characterised in that the operating switch comprises a first switch which, in its connected state, causes the power means to raise the rear bow, and a second switch which, in its connected state, causes the power means to lower the rear bow.

6. A vehicle as defined in claim 5, characterised in that the first switch closes when the key has been turned to a first position in the lock, and the second switch closes when the key has been turned to a second position in the lock.

7. A vehicle as defined in claim 6, characterised in that the power means comprises a double-acting hydraulic cylinder and a hydraulic pump for generating a hydraulic pressure for the hydraulic cylinder; that the first switch and the second switch are microswitches placed in the lock; and that the top comprises a control logic system designed to receive signals from the microswitches and control the operation of the hydraulic pump on the basis of the signals received from the microswitches.

8. A folding top for a vehicle comprising a passenger compartment, a luggage compartment in the rear part of the vehicle behind the passenger compartment, sides of the body, which limit the luggage compartment in the lateral directions, a tailgate hinged on the body so that it can be opened and closed, said tailgate limiting the luggage compartment in the rearward direction, said folding top (5) comprising:

a top cover of flexible material fitted to extend at least over the luggage compartment when the top is in its closed position, limiting the luggage compartment in the vertical direction, a U-shaped rear bow, to which a rear edge of the top cover is attached, the rear bow comprising a substantially horizontal transverse arm and two substantially forward directed arms at ends of the transverse arm, front ends of said two forward directed arms being connected to joints allowing a turning motion relative to the body, the rear bow being positionable between a lowered closed position, in which the rear bow leans against the body and tailgate in close contact therewith, and a raised open position, a power means for raising and lowering the rear bow, and an operating switch disposed proximate the tailgate for activating the power means.

9. A folding top as defined in claim 8, characterised in that the operating switch is mounted on the body near the tailgate.

10. A folding top as defined in claim 8, characterised in that the operating switch is mounted on the tailgate of the vehicle.

11. A folding top as defined in any claim 8, characterised in that the tailgate of the vehicle comprises a key-operated lock for locking the tailgate with respect to the body, and that the operating switch is connected to the lock, to be operated with the same key as the lock.

12. A folding top as defined in claim 8, characterised in that the operating switch comprises a first switch that, in its connected state, causes the power means to raise the rear bow, and a second switch that, in its connected state, causes the power means to lower the rear bow.

13. A folding top as defined in claim 12, characterised in that the first switch connects when the key is turned to a first position in the lock, and the second switch connects when the key is turned to a second position in the lock.

14. A folding top as defined in claim 13, characterised in that the power means comprises a double-acting hydraulic cylinder and a hydraulic pump for generating a hydraulic pressure for the hydraulic cylinder; that the first switch and the second switch are microswitches placed in the lock; and that the top comprises a control logic system designed to receive signals from the microswitches and control the operation of the hydraulic pump on the basis of the signals received from the microswitches.

* * * * *